APPARATUS FOR ANALYZING DISTORTIONS IN TELEGRAPH SIGNALS

Filed March 11, 1954 3 Sheets-Sheet 1

INVENTOR.
Lawrence M. Carver
BY Edwin Leisohn & Harry Cohen
ATTORNEYS

June 28, 1955 L. M. CARVER 2,712,038

APPARATUS FOR ANALYZING DISTORTIONS IN TELEGRAPH SIGNALS

Filed March 11, 1954 3 Sheets-Sheet 2

INVENTOR.
Lawrence M. Carver
BY Edwin Leisorhe & Harry Cohen
ATTORNEYS

June 28, 1955 L. M. CARVER 2,712,038

APPARATUS FOR ANALYZING DISTORTIONS IN TELEGRAPH SIGNALS

Filed March 11, 1954 3 Sheets-Sheet 3

INVENTOR.
Lawrence M. Carver

BY Edwin Leisch &
Harry Cohen
ATTORNEYS

United States Patent Office 2,712,038

Patented June 28, 1955

2,712,038

APPARATUS FOR ANALYZING DISTORTIONS IN TELEGRAPH SIGNALS

Lawrence M. Carver, Springdale, Conn., assignor to Stelma, Inc., Stamford, Conn., a corporation of Connecticut Application March 11, 1954, Serial No. 415,543

2 Claims. (Cl. 178—69)

The present invention relates in general to telegraph testing systems and, in particular, to the analysis of distortion in telegraph signals.

Telegraph distortion may be conveniently divided into three different components. The first of these is bias, which means that some asymmetrical condition, such as voltage unbalance, improper relay adjustment, or change in received signal strength has caused all marks to be either too long or too short. Bias may be either marking bias or spacing bias and both types of bias frequently occur in telegraph transmission systems, and generally affect all marking impulses alike and to the same extent. It is evidenced by advancement of the beginnings of all marking impulses relative to the beginnings of the start impulse, in the case of marking bias, and by retardation of the beginnings of the marking impulses relative to the beginning of the start impulse in the case of spacing bias. Marking bias is a condition of shorter than normal intervals between the mark-to-space transition, which begins the start impulse, and all space-to-mark transitions in the code combination, and spacing bias is a condition of longer than normal conditions between the mark-to-space start impulse transition and space-to-mark transitions of the code combination.

The second kind of distortion is designated as characteristic and fortuitous distortion. Characteristic distortion depends upon the electrical and mechanical characteristics of the circuit and the particular signal combination which is being transmitted. Characteristic distortions may vary from impulse to impulse and are dependent on the sequence or combination of preceding impulses. This form of distortion is caused mainly by typical imperfections in the signal wave shape impressed upon the receiving relay, occasioned, for example, by the effect of a low pass filter with comparatively low cut off in a D. C. telegraph circuit. Fortuitous distortion, which is non-repetitive, is the result of a random effect due to interference from other communication facilities and from power systems, chatter of relay contacts, etc. Fortuitous and characteristic distortion have the effect of displacing both the space-mark and the mark-space transitions.

The remaining type of distortion is designated as end distortion. This type of distortion affects the time of occurrence of the ends of marking impulses, which are mark-to-space transitions, relative to the mark-to-space start impulse transition. This differs from the marking and spacing bias which, as heretofore stated, affects the beginnings of the marking impulses. Like marking and spacing bias, respectively, marking and distortion is characterized by a lengthening of the marking intervals, and spacing end distortion is characterized by a shortening of the intervals, so that end distortion of either type displaces the mark-to-space transitions.

In teleprinter or teletypwriter operation, the intelligence of a single character is contained within the various combinations of the five unit Baudot code, with each group preceded by a start impulse or open line interval, to initiate the operation of the receiving device, and followed by a closed line interval to bring all apparatus to a stop in anticipation of the next character. Each character, therefore, consists of a total of seven unit intervals which includes a start pulse of unit length, a selecting period five time units in length, and a stop pulse. In general, any one of the five elements of the selecting period may be either marking or spacing. When such a signal is transmitted to a teleprinter or teletypewriter, for example by a receiving relay, the beginning of the start pulse causes the selective mechanism of the receiving machine to commence rotation. It will then rotate in substantial synchronism with the sender for a revolution until brought to rest by a stoplatch. At the midpoint of each of the five selection units or pulses, an examination of the received signal is made, and, accordingly, as the armature of the receiving relay is resting on marking or spacing, mechanical parts will be positioned so that one particular character and no other will be printed. In case any particular transition of the selecting group is displaced, in either direction, by fifty per cent or more of a selection unit, a wrong selection will inevitably be made. Since each selection point is timed with respect to the beginning of the start pulse, the displacement of the various transitions from their proper position relative to the beginning of the start pulse is of significance, rather than the total lengthening or shortening of any particular unit pulse, as in manual telegraphy.

The primary object of the present invention is to provide an apparatus, utilizing the five unit telegraph code signal combination, to analyze telegraph distortion by a visual indication of the bias or distortion present in the transmission of signal impulse changes from marking to spacing, and vice versa.

Another object is the provision of a telegraph distortion analyzer utilizing a cathode ray tube having provision to directly indicate on its face each type of telegraph distortion, as well as the extent or percentage thereof.

Another object is the provision of a telegraph distortion analyzer which will show the displacements of all transitions of the telegraph signal and thus will indicate any type of distortion which affects telegraph transmission.

Another object is the provision of a telegraph distortion analyzer means which obviates the need for test signals and which indicates distortion measurements directly from regular teletypewriter traffic.

A further object is the provision of a telegraph distortion analyzer of generally improved operation and efficiency, which is simple to connect into the teletypewriter loop or local telegraph circuit, and which is easy to operate.

A still further object is the provision of purely electronic means for isolating the telegraph loop from the telegraph distortion analyzer chassis whereby to obviate the use of a relay.

The above and other objects, features and advantages of the present invention will be more fully understood from the following description considered in connection with the accompanying illustrative drawings.

In the drawings, which illustrate the best mode presently contemplated for carrying out the invention:

Figures 1, 4, 5, 6, 7:
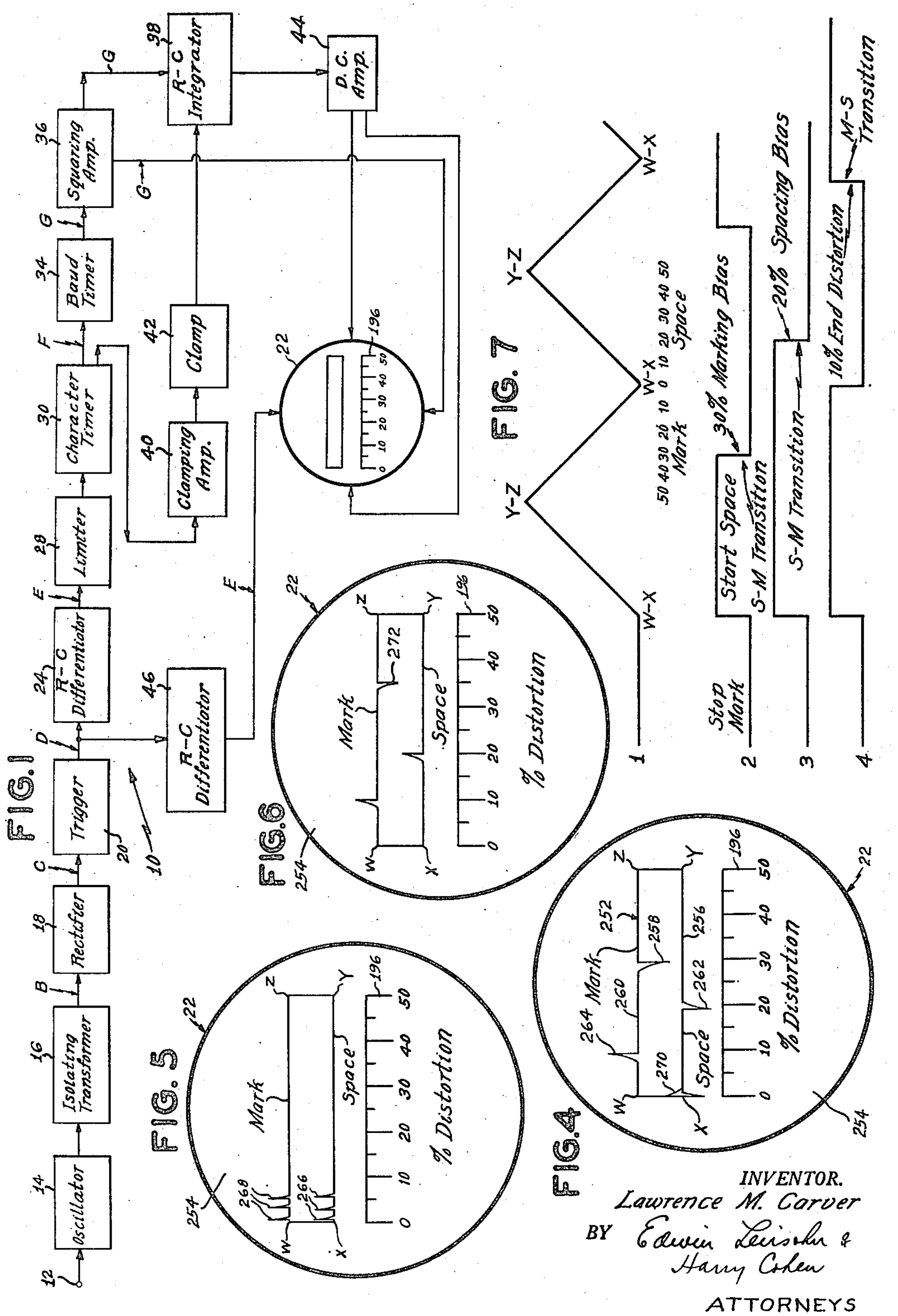
Fig. 1 is a block diagram of an apparatus pursuant to the present invention.
Figs. 4, 5 and 6 illustrate typical indications of distortion on the face of the cathode ray tube of the analyzing apparatus.
Fig. 7 illustrates various forms of bias distortion as correlated with the horizontal sweeps of the cathode ray tube.
Figure 2:
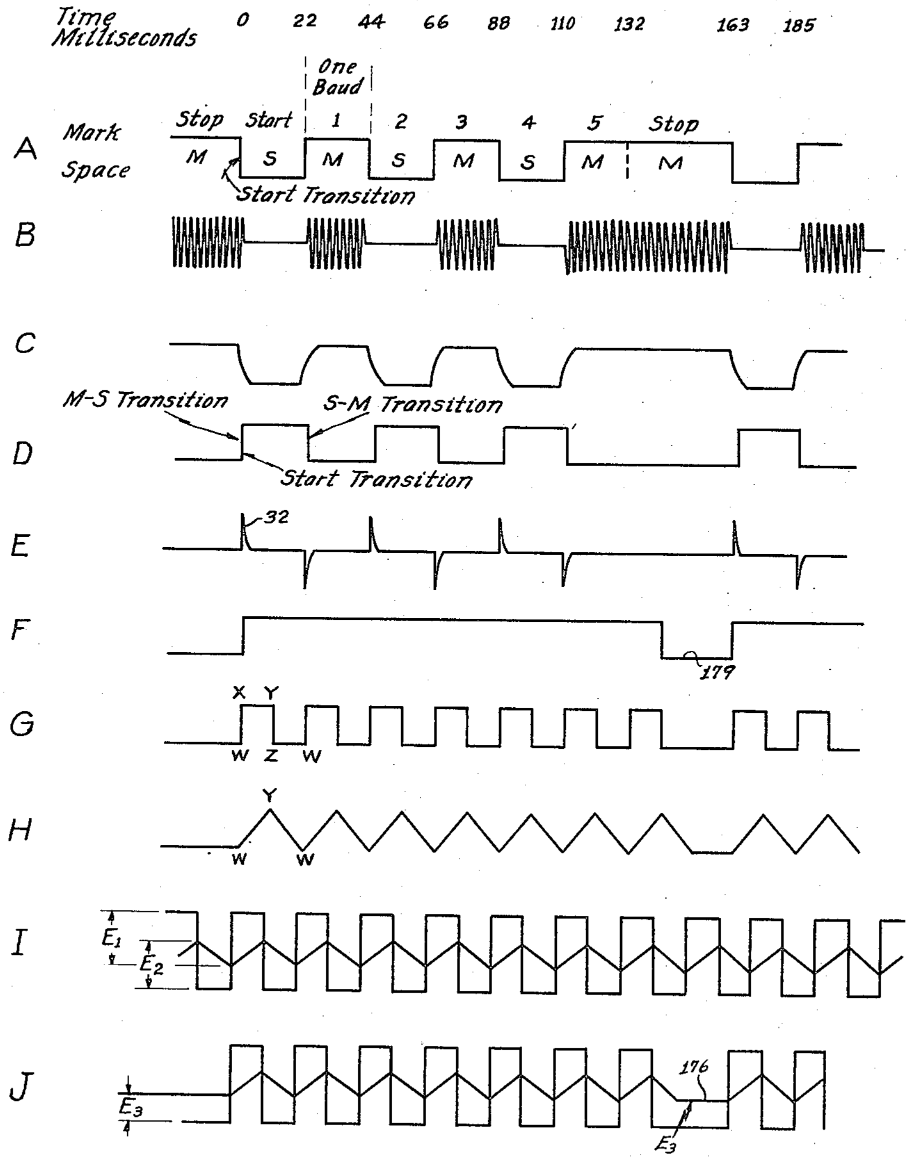
Fig. 2 is a chart illustrating wave forms at various points on the block diagram, the signal being illustrated for the character or letter Y in the Baudot code.

Referring now to Figs. 1 and 2 in detail, which illustrate, respectively, a block diagram and a chart of wave forms for the telegraph distortion analyzer apparatus 10, of the present invention, the reference numeral 12 in Fig. 1 designates that part of the telegraph distortion analyzer apparatus through which the signals are received from a telegraph loop. The letters appearing opposite each of the wave forms of Fig. 2 correspond to the wave forms which are present at the correspondingly lettered circuit points in Fig. 1. Fig. 2, line A, illustrates the wave form for the character or letter Y of the Baudot code, which would appear at the signal input 12 when the letter Y is being transmitted over the telegraph loop.

Pursuant to a feature of the present invention, the chassis of the telegraph distortion analyzer apparatus 10 is isolated from the telegraph loop without the necessity of utilizing a relay, as heretofore. More specifically, provision is made for an input circuit which is completely isolated from ground and from the chassis of the analyzer. Said input circuit includes the input 12 from which the signal is fed to an oscillator 14, which, in the apparatus as presently constructed, produces a 20 kilocycle signal on the transmission of a mark pulse through the loop. The signal output of the oscillator stage 14 is applied to an isolating transformer 16 which couples the signal to a rectifier stage 18. The rectifier serves to restore the signal to a D. C. voltage. The A. C. signal applied to the rectifier 18 is illustrated at line B in Fig. 2, and the rectified D. C. output thereof is illustrated at line C in Fig. 2. The output from the rectifier stage 18 is applied to a trigger stage 20 to provide a uniform square wave signal at the output of said trigger stage, as indicated by Fig. 2, line D. It will be noted that the latter wave form, at the output of the trigger stage 20, is substantially the same as the telegraph signal wave form Fig. 2, line A, at the input to the oscillator stage 14, except that the trigger output is reversed by 180° from the signal input to the oscillator.

The input circuit constituted by the oscillator 14, the isolating transformer 16, the rectifier 18 and the trigger stage 20 provide the isolation function of a relay in that these components serve to isolate the apparatus 10 from the telegraph loop. In addition, the described input circuit provides the following advantages: a resistive input, no distortion or bias is added to the distortion or bias present in the telegraph loop, the elimination of "bounce" or contact trouble associated with a relay, and the elimination of major maintenance problems resulting from the use of a relay so that the maintenance problems are comparatively minor and no adjustments are ever required.

The apparatus 10 includes a cathode ray tube 22 and the latter is provided with a sawtooth sweep voltage, as illustrated in Fig. 2, line H. When applied to the horizontal deflecting plates of the cathode ray tube 22, this sweep voltage supplies a horizontal line or trace on a time base against which the telegraph signal transitions are seen as vertical pips. In order to provide this type of sweep voltage presentation, provision is made for parallel circuits between the trigger stage 20 and the cathode ray tube 22. More specifically, in one of said parallel circuits, the signal voltage appearing at the output of the trigger stage 20 is differentiated at the RC differentiator 24 to produce the pulses illustrated in Fig. 2, line E. The differentiated output of the trigger stage 20 is applied to a limiter stage 28 which passes only the positive pulses illustrated in line E of Fig. 2, and thereby suppresses the negative pulses which may adversely affect the timing of a character timer or Baud timer gate stage 30. The first positive pulse indicated at 32 in line E of Fig. 2, which represents the mark-to-space start transition, is used to operate the character timer stage 30. Said stage 30 is a monostable multivibrator and produces a gate voltage, as illustrated at line F of Fig. 2. The character timer or gating stage 30 operates a Baud timer stage 34 to produce one cycle of square wave output from the stage 34 corresponding to each Baud of input signal, indicated at line G of Fig. 2. The character timer stage 30 gates the Baud timer 34 on for six and one-half cycles of operation. Adjustments for timings in the character timer and Baud timer stages are provided for 60, 75 and 100 words per minute telegraph speeds. Provision is also made in the Baud timer stage for perfectly balancing the duration of each half cycle signal from said stage by a balance control in the circuit thereof. Since the output of the Baud timer stage 34 is not a perfect square wave, provision is made for supplying the output of the Baud timer stage to a squaring amplifier stage 36 so as to provide a perfect square wave signal to operate the circuits of the cathode ray tube 22.

In order to provide the desired sawtooth voltage for operation of the horizontal sweeps of the cathode ray tube, provision is made for a resistance-capacitance integrating circuit having a comparatively long time constant, said integrating circuit being indicated at 38 at the output of the amplifier stage 36. If the output of the squaring amplifier 36 were a continuous square wave voltage, a perfectly uniform continuous sweep voltage would be provided by the integrator 38. Under these conditions, the relation between the square wave voltage output of the Baud timer 34 and the sawtooth voltage output of the integrator 38 would be as indicated at line I of Fig. 2, where $E_1$, representing the potential difference between the square wave maximum and the sawtooth minimum voltages, is equal to the voltage $E_2$, which represents the difference in potential between the sawtooth maximum voltage and the square wave minimum voltage. However, the telegraph signal is not continuous due to the start-stop intervals between the various characters where the stop interval is unequal to the Baud intervals, it being noted from line A of Fig. 2 that each of the Baud intervals is 22 milliseconds in duration, whereas the stop interval is 31 milliseconds in duration. In order to secure a proper sawtooth wave form output from the RC integrator 38, it is therefore necessary to hold the voltage across the capacitor of the integrator at the value of $E_3$, as indicated in Fig. 2, line J, during the stop mark when the oscillator 14 is inoperative. In order to accomplish this purpose, provision is made for a clamping circuit constituted by a clamping amplifier stage 40 which is connected to the output of the character timer 30, and the clamp stage 42 which is connected to the output of the amplifier 40. The clamping amplifier stage 40 functions to square the output of the character timer and to provide the proper signal phase, the clamp stage 42 serving to apply the reference potential $E_3$ to the capacitor of the RC integrator 38 during the stop mark cycle of the character timer 30, as will be apparent from a comparison of the wave forms F and J of Fig. 2. During the operating cycle of the character timer stage, the potentials are such that the clamp stage 42 is inoperative and the sawtooth sweep voltage, as indicated in line H of Fig. 2 is unhampered in wave shape. Provision is also made, as hereinafter described, for a clamp control between the clamping amplifier 40 and the clamp stage 42 so that the exact amplitude of the reference voltage $E_3$ may be established.

The peak voltage output of the RC integrator 38 is amplified by the D. C. amplifier stage 44 which applies a push-pull output to the horizontal deflecting plates of the cathode ray tube 22. Two signals are applied to the vertical deflecting plates of the cathode ray tube 22. To provide one of these signals, provision is made for the other parallel circuit at the output of the trigger stage 20 which includes the RC differentiator 46, which differentiates the signal from the trigger stage 20 to apply a signal, as shown in line E of Fig. 2 to the upper vertical deflecting plate of the cathode ray tube. A square wave signal output from the squaring amplifier stage 36, as illustrated in Fig. 2, line G, is applied to the lower vertical deflecting plate of the cathode ray tube.

Figure 3:
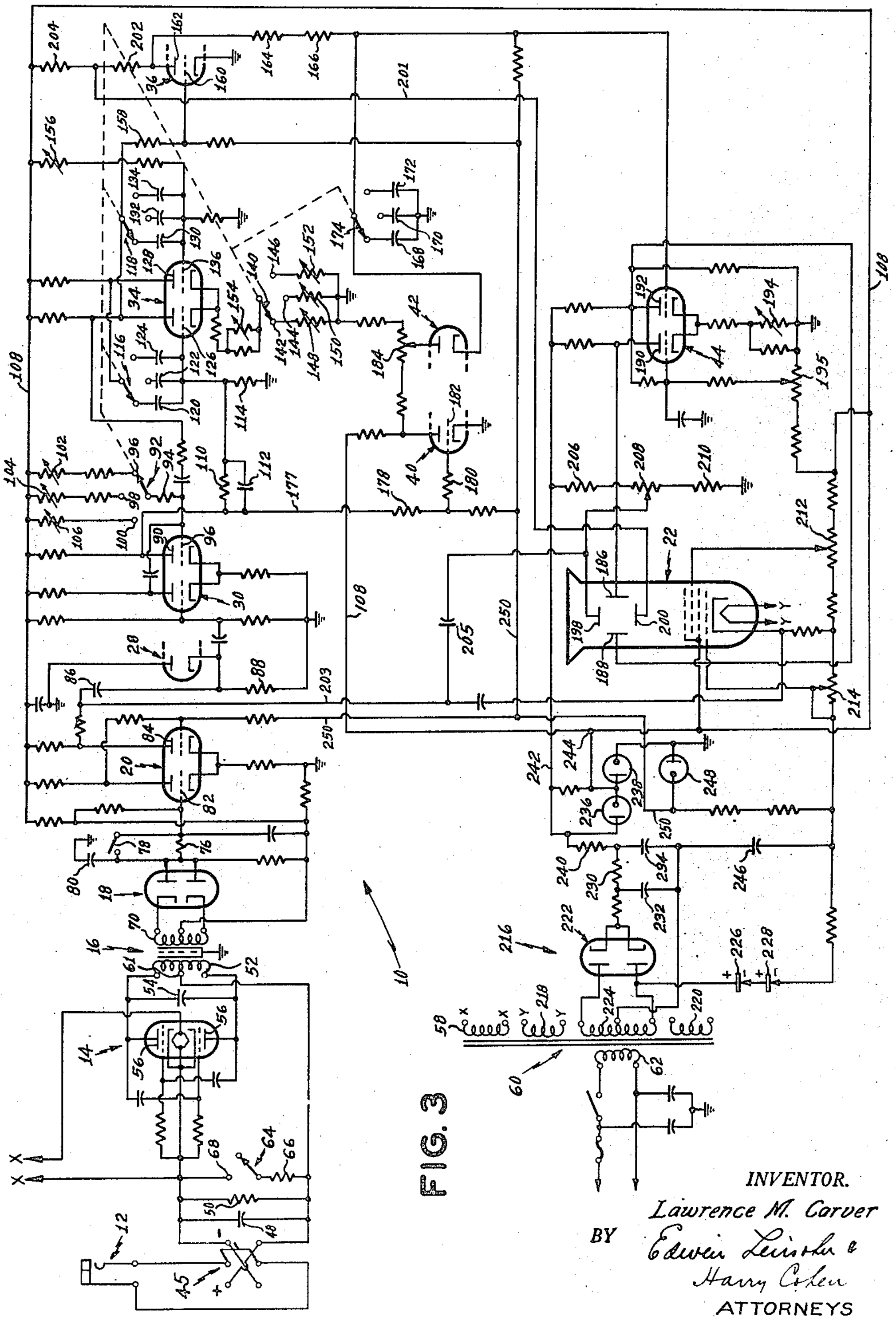
Fig. 3 is a schematic circuit diagram of the apparatus.

Fig. 3 illustrates the schematic diagram of the apparatus of the present invention. As here shown, the signal input means 12 is constituted by a jack which is adapted to receive a plug connected to a telegraph loop, over which signals that are to be measured for bias or distortion are transmitted, for coupling the analyzer apparatus 10 to the telegraph loop. Consequently, the apparatus 10 can be readily patched in series in a teletypewriter loop or local telegraph circuit. A double-pole double-throw polarity switch 45 is connected in circuit with the jack 12, the capacitor 48 and the resistor 50 being connected across the switch 46 and constituting the input for the oscillator 14. The primary winding 52 of the isolation transformer 16, the core of which is grounded, and the capacitor 54 constitute the tank circuit for the oscillator 14. The oscillator stage 14 is energized by the voltage which is developed across the resistor 50 when a mark pulse is transmitted through the telegraph loop and received therefrom through the jack 12, said voltage developed across the resistor 50 supplying the potential for the plates 56 of the oscillator. The filament voltage for the oscillator 14 is supplied by the secondary winding 58 of the power transformer 60, the primary 62 of which is connected to the A. C. line. Provision is made in the oscillator stage 14 for the input switch 64 which allows similar operation on either 20 or 60 milliampere loop circuits. When switch 64 is open as shown in Fig. 3, operation at 20 milliamperes is provided, the D. C. voltage drop developed across resistor 50 supplying plate voltage to tube 14. When switch 64 is closed, the parallel resistance of resistor 50 and resistor 66 equals approximately one-third the resistance of resistor 50 so that a 60 milliampere loop current provides the same anode potential for tube 14. As previously indicated, when the mark impulse is transmitted through the telegraph loop, the oscillator 14 is energized by the voltage developed across the resistor 50, and when the telegraph loop is on space, no voltage is developed across the resistor 50 so that the oscillator 14 is inoperative and provides no signal output. The tube 18 is connected as full wave rectifier across the secondary 70 of the isolating transformer 16 to rectify the oscillator output. The D. C. voltage developed by the rectifier tube 18 across the load resistor is filtered and applied to the trigger tube 20 for operating the latter. While a certain amount of filtering action is provided for the D. C. output of the full wave rectifier 18, provision is made to increase the filtering action for cases where it is not desired to see short duration pulses from the telegraph line. In this connection, provision is made for the switch 78 which, when closed, shorts the resistor 76 to provide a minimum of filtering action. When the switch 78 is open, the resistor 76 and the capacitor 80 supply a substantial amount of filtering in the signal applied to the trigger stage 20 so that spikes or holes of short duration in the loop signal do not appear at the output of the trigger stage.

As will be apparent from line A of Fig. 2 which indicates the telegraph signal for the character Y, the signal applied to the oscillator 14 comprises the marking and spacing pulses as indicated by M and S, respectively, the oscillator 14 being operative only during the marking pulses to energize the rectifier 18 through the medium of the isolating transformer 16 so as to provide at the output of the rectifier a wave form envelope representative of the signal variations indicated at line B of Fig. 2, said latter variations being supplied at the input to the rectifiers. The rectifier output, as indicated at line C of Fig. 2, constitutes the modulation envelope of the oscillator output, which is applied as a D. C. voltage to the grid 82 of the trigger tube 20. The output of stage 20 is developed in the circuit of the anode 84 thereof, and is indicated in line D of Fig. 2. It will be noted that the output of the trigger stage 20 is reversed by 180° from the original signal input at the jack 12 indicated in line A of Fig. 2, so that the mark-space or M—S transition now arises from a minimum to a maximum voltage rather than dropping from a maximum to a minimum voltage, as in line A, and similarly, the space-mark or S—M transition now falls from a maximum to a minimum voltage, rather than vice versa, as in line A of Fig. 2. As previously indicated, the oscillator stage 14, the isolating transformer 16, the rectifier stage 18 and the trigger stage 20 constitute an electronic input circuit and provide the advantage of a relay in that these stages serve to isolate the analyzer 10, at the input thereof, from the telegraph loop. However, these stages, while providing this highly advantageous function of input isolation which is usually supplied by a relay, obviate the disadvantages usually associated with a relay between the telegraph loop and a bias indicator or tester, in that these stages do not add to the bias or distortion present in the telegraph loop, these stages obviate the contact or "bounce" troubles inherent in the use of a relay, these stages require no adjustments and require only very minor maintenance when compared with the maintenance and adjustments required by an input relay, and further, these stages provide a resistive input.

The previously described RC differentiator 24 at the output of the trigger stage 20 is constituted by the capacitor 86 and the resistor 88. The differentiator output developed across the resistor 88 for the character Y is indicated at line E in Fig. 2. Said differentiated output is applied to the diode limiter stage 28 which is connected in the circuit to provide negative limiting so as to pass only the positive pulses. The negative pulses are limited by the limiter stage 28 so that they may not adversely affect the timing of the following character timer stage 30. As here shown, the limiter or clipper tube 28 is constituted by one half of a duo-diode, the other half of which constitutes the clamping tube 42. The character timer stage 30 provides a gating voltage for the Baud timer stage 34, said gating voltage being indicated at line F in Fig. 2. The gating tube 30 is constituted by a monostable or one shot multivibrator. The multivibrator 30 is triggered by the first M—S start transition which is constituted by a positive pulse at the output of the trigger stage 20, as indicated by the pulse 32 in line E of Fig. 2. The multivibrator 30 cannot be turned off by a negative pulse at its input but will operate through its full gating cycle. While the character timer or Baud timer gate 30 is in its cycle of operation, the output plate 90 thereof is at B+ potential and the multivibrator stage 34 operates for six and one-half cycles in a symmetrical fashion, as indicated by line G in Fig. 2. In order to provide for operating the character timer stage 30 at speeds of 60, 75 or 100 words per minute through the telegraph loop, provision is made for the switch 92, the movable contact arm of which is connected to the resistor 94, which, in turn, is connected to the control grid 96 associated with the plate 90 of the multivibrator 30. The three stationary contacts for the switch 92 are indicated at 96, 98 and 100, and said stationary contacts represent speed settings of 60, 75 and 100 words per minute, respectively, to correspond with the transmission speeds through the telegraph loop. Said stationary contacts are in circuit with the rheostats 102, 104 and 106, respectively, which are connected to the B+ line 108, said rheostats providing means for a proper adjustment of the timing speeds which are varied by operation of the switch 92. The output from the gating stage 30 across the combination of the resistor 110 and capacitor 112 and the resistor 114 is applied to the Baud timer stage 34. The Baud timer stage 34, as here shown, is a multivibrator which provides a square wave output, as indicated by line G of Fig. 2. As previously indicated, the character timer stage 30 gates the Baud timer stage 34 for six and one-half cycles of operation. Provision is made in the multivibrator stage 34 for the switches 116 and 118 which are ganged for operation with the previously mentioned speed control or speed setting switch 92 in the character timer or gating stage.

30. The three stationary contacts of the switch 116 are connected to the capacitors 120, 122 and 124, respectively, which are connected to the input grid 126 of the multivibrator 34, the movable member of the switch 116 being connected in the circuit of the opposite plate 128 of the multivibrator. The switch 118 is also provided with three stationary contacts which are connected to the capacitors 130, 132 and 134, respectively, said capacitors being connected in common to the grid 136 of the multivibrator associated with the plate 128 thereof. The capacitors associated with the switch 116 and the capacitors associated with the switch 118 provide optimum operation of the multivibrator 34 at each of the speeds of 60, 75 and 100 words per minute. Provision is made also for the switch 140 which is ganged for operation with the previously mentioned switches 92, 116 and 118. As illustrated, the switch 140 is in the cathode circuit of the multivibrator stage 34 and the three stationary contacts 142, 144, and 146 of the switch 140 are connected to the rheostats 148, 150 and 152, respectively. These rheostats allow for the adjusting of the cathode circuit to the speeds of 60, 75 and 100 words per minute, the rheostat 148 being used to adjust to the speed of 60 words per minute, the rheostat 150 being used to adjust to the speed of 75 words per minute, and the rheostat 152 being used to adjust to the speed of 100 words per minute. Provision is also made for the rheostat 154 in the cathode circuit of the multivibrator 34, said rheostat being connetced to the movable arm of the switch 140. The rheostat 154 is a front panel speed control for the distortion analyzer apparatus 10 and is set to the center of its range before the other speed controls are adjusted. Provision is also made for a means of perfectly balancing the duration of each half cycle signal output from the multivibrator stage 34. More specifically, provision is made for a balance control constituted by the rheostat 156 connected between the B+ line 108 and the control grid 136 of the multivibrator 34. The rheostat 156 is adjusted so that each half cycle of output from the multivibrator 34 is equal in duration. The paired capacitors 120 and 130, 122 and 132, and 124 and 134 are selected to be of equal value so that the balance control 156 is good for all speeds.

Since the output of the Baud timer stage 34 may not be a perfect square wave, provision is made for the stage 36 which constitutes a squaring amplifier to provide the required square wave. The output from the Baud timer stage 34 is applied through the resistor 158 to the control grid 160 of the tube 36 so as to drive the latter from cutoff to said saturation. The tube 36 is one half of a duo-triode, the other half of which is constituted by the tube 40. The output from the plate 162 of the tube 36 is applied to an RC integrating circuit of long time constant. Said RC integrating circuit comprises the series resistors 164 and 166 and one of the capacitors 168, 170 and 172, depending upon the setting of switch 174. It will be noted that switch 174 is ganged for operation with the previously mentioned switches 92, 116, 118 and 140. The capacitor 168 is used as an integrating capacitor for a 60 word per minute speed, the capacitor 170 is used as the integrating capacitor for a 75 word per minute speed, and the capacitor 172 is used as the integrating capacitor for a 100 word per minute speed, it being noted that these capacitors are connected to the three stationary contacts, respectively, of the switch 174. This RC integrating circuit produces the desired sawtooth sweep voltage for operation of the cathode ray tube 22, the square wave output of the squaring amplifier 36, which constitutes the input to the integrator circuit, being indicated at line G in Fig. 2. If the output of the squaring amplifier stage 36 were a continuous square wave voltage, a perfectly uniform continuous sweep voltage would be developed across the integrating capacitor 168, 170 or 172, as the case may be. Under these conditions, the relation between the square wave voltage output of the squaring amplifier 36 and the sawtooth voltage developed across the capacitor of the integrator circuit would be as indicated at line I of Fig. 2, where it will be noted, as previously indicated, that the voltage $E_1$ taken between the square wave maximum voltage and the sawtooth minimum voltage would be equal to the voltage $E_2$ taken between the maximum sawtooth voltage and the minimum square wave voltage. However, as will be apparent from line A of said figure, the telegraph signal is not continuous but is a start-stop signal, it being noted that the stop interval of 31 milliseconds is unequal to the Baud intervals of 22 milliseconds. Therefore in order to secure a proper sawtooth wave form across the integrating capacitor 168, 170 or 172, as the case may be, it is necessary to maintain the voltage across said integrating capacitor at the reference potential indicated by $E_3$ during the stop mark, when the oscillator 14 is inoperative. This is accomplished by utilizing a clamping circuit constituted by the stages 40 and 42 to provide the desired reference potential to the integrating capacitor, so as to maintain the sawtooth potential at the reference potential $E_3$ during the period when the oscillator 14 is inoperative, as indicated at 176 in line J of Fig. 2. For this purpose, the plate 90 of the character timer multivibrator 30 is connected through the lead 177 and the resistors 178 and 180 to the control grid 182 of the clamping amplifier 40. The clamping amplifier 40 serves to square the output of the multivibrator 30 and to provide the proper signal phase thereto for operating the diode clamp tube 42. It will be noted that the previously mentioned switch 174 serves to switch one of the capacitors 168, 170 and 172 into the cathode circuit of the clamping diode 42. Consequently, it will be apparent that the clamping stage 42 charges one of the integrating capacitors to the reference potential $E_3$ during the stop mark cycle of the gating stage 30, as will be apparent from a comparison of the portion 179 of the wave form in line F of Fig. 2, which represents the stop mark cycle of the gating stage 30, and the corresponding portion 176 of the sawtooth voltage wave in line J of Fig. 2. During the operating cycle of the gating stage 30, the potentials are such that the clamping diode 42 is not conducting and the sawtooth sweep voltage is unhampered in wave shape. The variable resistor 184 in circuit between the plates of tubes 40 and 42 constitutes a clamp control for adjusting or setting the reference voltage $E_3$ to its exact amplitude. The sawtooth sweep voltage developed across the integrating capacitors 168, 170 or 172, as the case may be, is applied to the D. C. amplifier stage 44 where it is amplified and applied as a push-pull output to the horizontal deflecting plates 186 and 188 of the cathode ray tube 22, it being noted that the plate 186 is connected to the plate 190 of the amplifier 44 and the deflecting plate 188 is connected to the plate 192 of the amplifier 44. The variable resistor 194 in the cathode circuit of the amplifier 44 may be adjusted to vary the gain of the amplifier and therefore provides an adjustment for varying the length of the horizontal trace on the screen of the cathode ray tube, to adjust the trace or base line length to the length of the calibrated scale 196 (Figs. 1 and 4–6) which indicates the percentage of distortion. However, little effect is produced on the horizontal position of the base line by varying the gain through the adjustment of the resistor 194 since both halves or both sections of the horizontal amplifier stage 44 are affected in the same manner. The variable resistor 195 in the circuit of the horizontal amplifier 44 constitutes the usual horizontal positioning adjustment for the cathode ray tube 22.

Two signals are applied to the vertical deflecting plates of the cathode ray tube 22. More specifically, as here shown, it will be noted that the lower vertical deflecting plate 200 is connected through the line 201 to the voltage divider constituted by the resistors 202 and 204 in the plate circuit of squaring amplifier 36 to provide a square wave output to the lower vertical deflecting plate as indicated by the wave forms in line G of Fig. 2. The upper vertical deflecting plate 198 receives a signal from the output of the trigger stage 20 through the lead 203 connected to the output plate 84 of the trigger stage, and through an RC differentiator constituted by the capacitor 205 and the resistors 206, 208 and 210. The variable resistor 208 constitutes the vertical positioning control for the cathode ray tube 22. The differentiated signal, as indicated in line E of Fig. 2 is applied, as voltage pulses, through this circuit to the upper vertical deflecting plate 198.

The variable resistor 212 constitutes the standard focus control for the cathode ray tube and the variable resistor 214 constitutes the standard intensity control for the cathode ray tube.

The power supply for the analyzer 10 is generally indicated by the reference numeral 216. Said power supply utilizes the previously indicated power transformer 60 having the previously described secondary 58 for increasing the input of the analyzer 10 when the switch 64 is closed at contact 68. The secondary winding 218 supplies the filament voltage for the cathode ray tube 22. The secondary winding 220 supplies the filament voltage for tubes 18, 20, 28, 30, 34, 36, 40, 42, and 44, and the full wave power supply rectifier tube 222, the plates of which are connected to the secondary winding 224. The secondary winding 224 energizes the tube 222 to supply the positive voltages for the apparatus and also supplies high voltage to the selenium rectifiers 226 and 228 which supply the negative voltages for the circuit. A filter circuit in the positive voltage supply is constituted by the resistor 230 and the filter capacitors 232 and 234. Additional filtering is secured through the use of the voltage regulator tubes 236 and 238 and the resistor 240 which supplies these tubes. A high positive voltage is supplied through the line 242 to the anodes of the horizontal amplifier stage 44, and the various other tubes which require plate potentials are supplied through the previously indicated line 108, with a lower positive potential, from the point 244 in the power supply. The capacitor 246 provides filtering in the negative supply which, in the present construction, provides a negative 400 volts for the cathode ray tube 22 and also operates the regulator tube 248 to secure a negative 105 volts for bias purposes, as indicated by the line 250 which supplies the trigger stage 20, the clamping amplifier 40, the Baud timer stage 34 and the squaring amplifier stage 36 with the required bias voltages.

Referring now to Fig. 4, there is indicated a typical trace 252 which appears on the face 254 of the cathode ray tube screen through the operation of the previously described circuit, as illustrated in Fig. 3. When no signal is applied to the analyzer apparatus 10, a spot will be seen on the cathode ray tube screen 254 at point W thereon. On the first M—S or start transition of the signal, as indicated in lines A and D of Fig. 2, the lower plate 200 becomes positive, as indicated in line G of Fig. 2, and the trace moves down from W to X, as indicated in Fig. 4. The trace then moves across the face of the cathode ray tube from left to right, from X to Y, as the sawtooth voltage goes positive from W to Y, as in line H, of Fig. 2, then moves rapidly up to Z as the lower plate becomes negative, and then back to the starting point W, as the sawtooth voltage goes negative. Seven complete rectangular patterns or traces are made on the screen of the cathode ray tube for one character transition. Consequently, it will be apparent that there is one visible rectangular trace pattern for each of the seven impulses of the Baudot code. Each pattern comprises a time base sweep having vertically spaced sweep lines or sweep areas 256 and 260, the upper base line or return portion 260 of the horizontal trace corresponding to an area of marking distortion and the lower base line or initial portion 256 of the horizontal trace corresponding to an area of spacing distortion. If the signal being measured has zero bias or no distortion, and the speed adjustment of the analyzer is correct, namely the analyzer having a speed adjustment which corresponds to the telegraph transmission speed through the telegraph loop, the application of the signal transitions, as indicated in line E of Fig. 2, to the upper vertical plate of the cathode ray tube will show or appear as positive and negative pulses, respectively, leading off the lower base line 256 of the rectangular pattern 252, as indicated at 270 at point X of Fig. 4. As will be apparent from a comparison of lines D and E of Fig. 2, the positive pulses are due to the M—S transitions while the negative going pulses are due to the S—M transitions. In normal teleprinters, the M—S transitions are made incorrect in time by improper speed or by end distortion. The S—M transitions are made incorrect by bias distortion on the signal.

Fig. 7 illustrates various forms of distortion in a teleprinter signal. In each case, only the first two Bauds of a character are shown since transitions at the later Bauds are treated in the same fashion as for the first two Bauds. Line 1 of Fig. 7 represents the sawtooth wave form for producing the upper and lower horizontal traces, a calibrated per cent distortion scale being indicated both for the marking area, which represents the return portion of the horizontal trace or the upper horizontal trace, and the spacing area or portion being represented by the left to right or lower horizontal trace. Line 2 of Fig. 7 illustrates a shortened start space due to marking bias, said start space being less than 22 milliseconds or one Baud. It will be noted that the S—M transition occurs during the Y to W portion of the sweep and, therefore, would produce a pulse, as shown in Fig. 4 at 258, on the upper horizontal sweep portion 260. Line 3 in Fig. 7 illustrates a signal with spacing bias, where the S—M transition occurs during the lower horizontal sweep from W to Y. An indication of this bias is seen at 262 on the lower horizontal portion 256 of the trace 252, in Fig. 4. Line 4 in Fig. 7 shows a M—S transition which occurs during the Y to W or upper horizontal portion 260 of the sweep, which represents the mark sweep or base line, and is displayed as a pulse at 264 in Fig. 4. If the speed of the analyzer 10 is set too slow, that is if the ganged switches 92, 116, 118 and 174 are set at a speed lower than the speed at which the characters or words are transmitted through the telegraph loop a series of upward pips, as indicated at 266 in Fig. 5, will be seen along the space or lower base line, close to the X side of the sweep. Conversely, if the speed is too fast, positive pips, as indicated at 268, will be seen along the mark base line close to point W of the sweep. When the speed is correctly adjusted for the transition speed of the telegraph signals, upward pips will be seen as one pip going upward at point X on the lower or space base line, as indicated at 270 in Fig. 4.

Fortuitous distortion will cause all pips to jitter or move back and forth on both the mark and space base lines, at the W—X side of the trace. Since fortuitous distortion applies to both the S—M and M—S transitions, the pips or pulses will appear both in the upward and downward direction, as indicated in Fig. 6. The maximum peak distortion will be indicated by that pip or pulse which may appear at any time farthest toward the Y—Z side of the base lines, as indicated for example by the pip 272 which indicates a total fortuitous distortion of 35 per cent in Fig. 6.

In view of the foregoing, it will be apparent that the present invention discloses a telegraph distortion analyzer apparatus which measures distortion by sampling each of the transitions in a character. It is immaterial which character is being transmitted. The telegraph distortion analyzer apparatus is patched in series into a telegraph loop or local telegraph circuit and is provided with an electronic input circuit which is completely isolated from ground and from the chassis of the unit. No test signals are required, the various measurements being measured on regular teletypewriter traffic. The per cent of distortion is read directly on a calibrated scale mounted directly on front of a cathode ray tube. The various components of distortion making up the total distortion are clearly indicated. A vertical pip on the vertically displaced base lines on the screen of the cathode ray tube indicates a transition. If all the transitions of the teletypewriter signal are in their proper position, that is, if a perfect signal is being transmitted, the pips or pulses will line up at the zero percentage distortion mark of the calibrated scale on the screen of the cathode ray tube. If any of the transitions are displaced with respect to the start impulse, the vertical pips or pulses on the cathode ray tube screen will be displaced along the calibrated scale. The direct reading scale indicates the amount that the transition is displaced. If all of the S—M transitions are displaced an equal amount, as in bias distortion, a pip or pulse in a direction downward from the base lines will be observed. A pip or pulse going downward from the upper base line is indicative of marking bias. A pip or pulse going down from the bottom base line is indicative of spacing bias. If all of the M—S transitions are displaced an equal amount, as in end distortion, a pip or pulse going upward from the base lines will be observed. In the case of fortuitous distortion when the transitions, both S—M and M—S may not be displaced equal amounts, the different displacements of each of the transitions is indicated on the screen of the cathode ray tube. Thus, more than one pip or pulse will be seen along the base line depending upon which transitions the fortuitous distortion has affected. The total distortion is indicated by the bias reading along the distortion scale. Therefore, it will be apparent that the analyzer apparatus of the present invention will show the displacements of all transitions of the teletypewriter signal and thus will indicate any type of distortion that affects telegraph transmission.

It will be understood that it is within the scope of the present invention to reverse the relative positions of the mark and space base lines on the cathode ray tube screen and also to reverse the direction of the pips or pulses indicative of both the S—M transitions and the M—S transitions.

While I have shown and described the preferred embodiments of my invention, it will be understood that various changes may be made in the idea or principles of the invention within the scope of the appended claims.

Having thus described my invention, what I claim and desire to secure by Letters Patent is:

1. Apparatus for analyzing distortion in code impulse signals, comprising cathode ray tube means provided with a screen, a sweep circuit timed to deflect the cathode ray beam through a visible time base sweep per code impulse interval, said sweep circuit including means operable to provide for each time base sweep distinct sweep areas on said screen with one of said sweep areas corresponding to the time of marking distortion and another of said sweep areas corresponding to the time of spacing distortion, and means operable in response to the reception of each signal at said apparatus for energizing said sweep circuit, whereby to provide a time base sweep cycle having a marking area and a spacing area for each impulse interval of each signal, and means for deflecting the cathode ray beam in response to signal transitions for obtaining a visible indication of said signal transitions, whereby to indicate visibly the various components of distortion by indicating the position of each transition relative to the start of the time base sweep as well as the position thereof relative to one or to the other of said sweep areas, and a signal input circuit having electronic means to isolate said apparatus from the source of said signals, said input circuit comprising oscillator means coupled to the signal source and energized during marking impulses, rectifier means, transformer means coupling said oscillator means to said rectifier means, and trigger means operable by output from said rectifier means for energizing said sweep circuit and said beam deflecting means.

2. An input circuit for connecting a telegraph signal distortion indicator to a telegraph loop, said circuit comprising an oscillator coupled to the loop and operable during marking intervals of the telegraph signal, rectifier means, and means coupling said oscillator to said rectifier means, whereby to provide a direct-current output representative of the marking and spacing intervals of telegraph code signals, said coupling means comprising a transformer, the primary of said transformer constituting the inductance in the tank circuit of said oscillator and the secondary of said transformer constituting the input to said rectifier.

References Cited in the file of this patent

UNITED STATES PATENTS

| | | |
|---|---|---|
| 1,969,573 | Montgomery | Aug. 7, 1934 |
| 2,423,829 | Ferrell | July 15, 1947 |
| 2,448,059 | Smith et al. | Aug. 31, 1948 |
| 2,481,354 | Schuler | Sept. 6, 1949 |
| 2,668,192 | Cory | Feb. 2, 1954 |